Sept. 23, 1969 H. E. WATKINS 3,468,691
METHOD OF AND APPARATUS FOR THE ELECTROSTATIC APPLICATION
OF SOLID PARTICLES TO ARTICLES
Filed Oct. 23, 1965 2 Sheets-Sheet 1

INVENTOR.
HARLEY E. WATKINS

BY Van Valkenburgh + Lord

ATTORNEYS

Sept. 23, 1969      H. E. WATKINS      3,468,691
METHOD OF AND APPARATUS FOR THE ELECTROSTATIC APPLICATION
OF SOLID PARTICLES TO ARTICLES
Filed Oct. 23, 1965      2 Sheets-Sheet 2

INVENTOR.
HARLEY E. WATKINS

BY Van Valkenburgh + Lowe

ATTORNEYS

United States Patent Office 3,468,691
Patented Sept. 23, 1969

---

3,468,691
METHOD OF AND APPARATUS FOR THE ELECTROSTATIC APPLICATION OF SOLID PARTICLES TO ARTICLES
Harley E. Watkins, Applewood Mesa, Colo., assignor to Lipoma Electronics, Delano, Calif., a copartnership
Filed Oct. 23, 1965, Ser. No. 504,038
Int. Cl. A23l 1/00; B05b 5/02
U.S. Cl. 117—17                        10 Claims

ABSTRACT OF THE DISCLOSURE

An electrostatic process and apparatus for treating food products with flavoring materials or condiments (referred to as particles) involves conveying the food products on a movable conveyer belt from above which the particles are allowed to gravitate from a hopper onto a moving surface and then onto the food products. Such surface and conveyer belt are charged at different potentials. A conductive member is positioned above such surface and laterally thereof and has a potential applied thereto which causes the particles leaving such surface to be attracted and to be moved upwardly (levitated) prior to falling onto the food products on the conveyor belt. This moving surface may be a rotating drum or a vibrating plate.

---

This invention relates to the electrostatic application and distribution of solid particles to articles, and more particularly to the electrostatic distribution and application of solid particles to food products, such as the application of flour to bread, rolls or the like, the application of salt, pepper, barbecue sauce powder, cheese, garlic and other condiments or flavoring to crackers, pretzels, nuts and other food products, the application of sugar to cereals or frosting to cookies, rolls, buns and the like, the application of tenderizing powders or other flavoring to meat products and the like, as well as the application of other condiments, flavoring and the like to various other types of food products.

Among the objects of this invention are to provide a novel method and apparatus for the electrostatic application of solid particles to various types of articles, particularly food products; to provide such a method and apparatus by which the distribution of solid particles on the articles is made more uniform; to increase the uniformity of the distribution of solid particles on such food products, such as carried by a conveyor or the like beneath a laterally elongated feeding device; to provide such a method and apparatus which is effective and efficient in operation; and to provide such apparatus which is simple in construction, is reliable in operation and is particularly adapted to carry out the method of this invention.

Additional objects and the novel features of this invention will become apparent from the following description, taken in conjunction with the accompanying drawings, in which.

Figure 1:
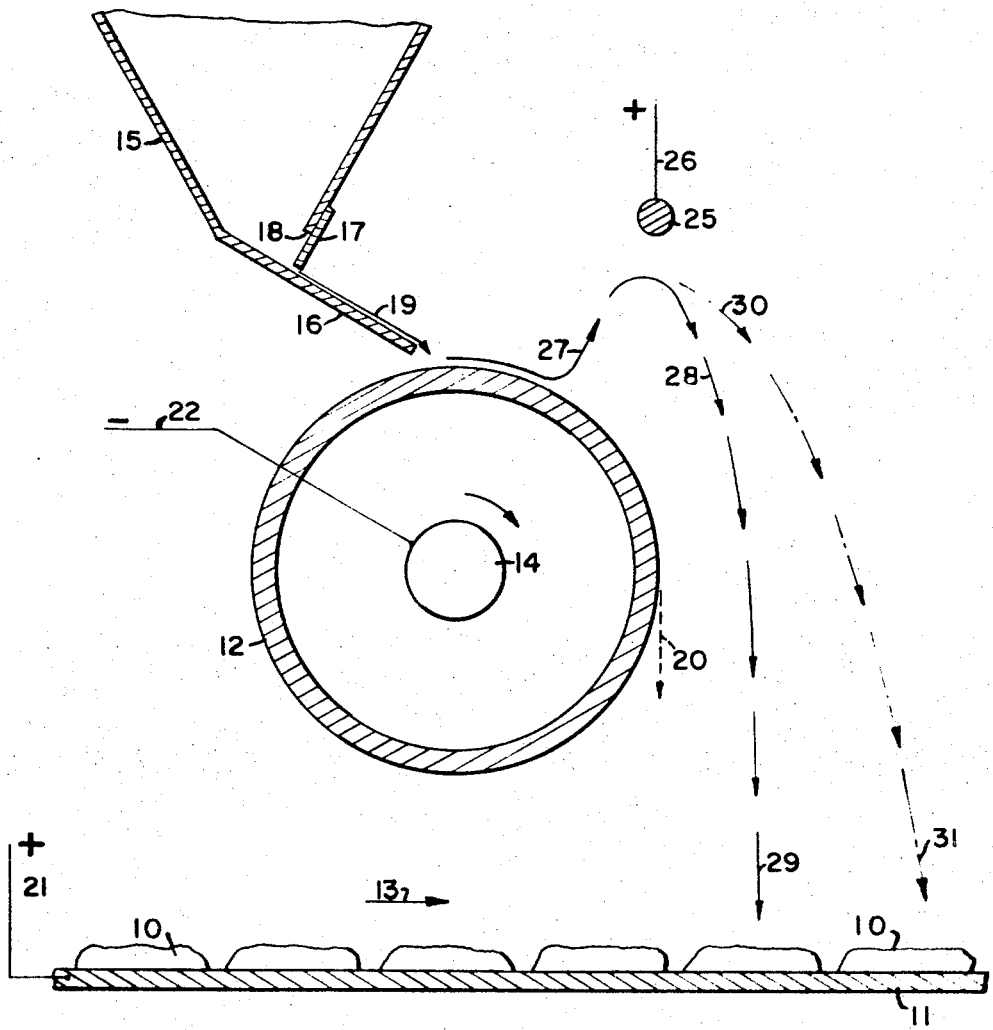
FIG. 1 is a fragmentary, vertical section of apparatus of this invention for applying solid particles to a series of products travelling along a conveyor beneath a distributing roll.

As illustrated in FIG. 1, a series of articles 10, to which the solid particles are to be applied, are moved in succession by a conveyor 11 beneath a distributing roller 12 having a width corresponding to the width of the conveyor 11. Conveyor 11 may be a travelling belt moved in the direction of the arrow 13, or may be any other suitable type of conveying mechanism, such as a reciprocating conveyor to which a slow motion is applied in the direction of the arrow 13, and a quick return motion in the opposite direction, so that the conveyor, in effect, slips beneath the articles 10 on the return stroke, with the net effect being a movement of the articles 10 in the direction of arrow 13. Roller 12 is mounted for rotation on a shaft 14, while the solid particles, which are to be applied to or distributed on the articles 10, are contained in a hopper 15, such as having converging front and rear walls and provided at the lower end with a feed plate 16, along which the solid particles slide downwardly onto the top of roller 12. The amount of solid particles discharged from the hopper may be regulated in a suitable manner, as by a gate 17, which may be adjusted upwardly and downwardly in a conventional manner, to control the flow through a discharge slot 18, which may also take the form of a series of holes in the lower edge of the front wall of the hopper 15. Normally, the solid particles will slide downwardly along feed plate 16, as indicated by the arrow 19, to fall onto the top of roller 12 and be carried by the roller, as it rotates, for discharge by gravity, as indicated by the dotted arrow 20.

A more effective application of the solid particles to the articles 10 may be secured by connecting a wire 21 between the positive terminal of a high voltage circuit and the conveyor 11 and a wire 22 between the negative terminal and shaft 14 for roller 12, so that the solid particles on the roller and the articles 10 on the conveyor will be charged with a potential difference, as on the order of 20,000 or 30,000 volts or more. This electrostatic charge will cause the solid particles to be attracted to and adhere to the articles 10, without the necessity for sprinkling by hand or the use of mechanical sprinklers. The use of an electrostatic potential difference between the solid particles and the articles to which the solid particles are to be applied not only simplifies and renders considerably less expensive the application of the solid particles to the articles, but also effects a more even distribution than hand or other types of sprinkling.

However, as the solid particles slide down the feed plate 16, any irregularities in the feed from the hopper 15, caused by unevenness in the downward movement of the solid particles in the hopper at various positions, or unevenness in the adjustment of gate 17, may be somewhat uneven laterally of the feed plate 16. As the solid particles are deposited on roller 12 and are carried around the roller, when they reach a point at which they will fall off the roller by gravity, the layer of solid particles on the roller tends to fall off unevenly. Thus, as the roller turns, the layer of particles will tend to build up by sliding along the surface of the roller, and the layer will fall off in bunches, at various positons along the roller. Thus, even with the electrostatic application, when the particles fall off the roller along the line of dotted arrow 20, neither the lateral nor the longitudinal distribution of the particles on the articles 10 is as uniform as desired. It will be noted that, when the articles 10 and the particles on roller 12 are opposite in polarity, there is some lengthening of the bunches of particles, in a longitudinal direction, but little or no improvement in lateral distribution or any change in the particles moving from the roller in bunches.

In accordance with the present invention, the charged particles are attracted from the roller and permitted to fall by gravity onto the articles, as by a rod 25, which extends parallel to the axis of the roller at a point approximately above the front edge of the roller. Rod 25 is connected by a wire 26 with the positive terminal of the high voltage circuit, so that the rod 25 will be charged at an opposite polarity to the particles charged negatively by their contact with roller 12 and will attract the particles from the roller 12. However, the rod 25 is spaced above the roller a sufficient distance that the particles will merely be attracted upwardly to the rod but will not reach the rod, so that they then may fall by gravity toward the articles 10 on the roller and, of course, will be attracted to the articles which are charged at a polarity opposite that of the particles themselves. Thus, the particles will be attracted upwardly, as indicated by arrow 27, to a position near the rod 25 and then fall downwardly along and between the paths indicated generally by arrows 28 and 29 and arrows intermediate the same, and by arrows 30 and 31 and arrows intermediate the same. Unexpectedly, the solid particles are attracted upwardly in a largely uniform pattern, both in number of particles attracted at any one time and also laterally, with respect to the conveyor and roller. Even though the particles are fed onto the roller nonuniformly, the attraction by rod 25 smooths out the lateral pattern, as it were, and also increases considerably the longitudinal distribution, thus enabling the particles to be deposited on the articles more uniformly and also to reach the sides of the articles, as well as the undersurfaces in the case of irregular articles, such as potato chips. In addition, instead of merely falling onto the articles 10 in discontinuous bunches, as when discharged generally along the path of the dottted arrow 20, when rod 25 is not energized, the solid particles will move in the form of what appears to be a mist or spray, some of them approaching closer to the rod 25 than others, and some of them falling along the general line of arrows 28 and 29, and others at various distances forwardly therefrom. The pattern of travel of the foremost particles is indicated generally by the dot-dash arrows 30 and 31 and the dot-dash arrows intermediate the same. For instance, in an apparatus of this invention, used with salt particles, and in which the distance from roller 12 to conveyor 11 is about 5 to 6 inches, the longitudinal distance between arrows 29 and 31 was increased from about 1½ inches at a voltage difference of 3,000 volts to over 5 inches at a voltage difference of 28,000 volts. The amperage was in the range of 20 milliamperes to 50 milliamperes. However, without rod 25 energized, the salt followed generally the path of arrow 20, with an area of fall at the conveyor of a maximum of about ½ inch in a longitudinal direction, when the voltage difference between roller 12 and conveyor 11 was increased to 28,000 volts. Also, the salt still fell in bunches from the roller, as when no voltage was supplied. The distribution of particles longitudinally of the conveyor results in a more uniform deposition on the articles 10, since segments of a layer of particles on roller 12 do not fall off periodically at various points. Also, the uniformity of application is further enhanced by the more uniform distribution of particles laterally of the conveyor, which is due to the lateral dispersion effect of the rod 25, when charged at a polarity opposite that of the particles. The exact cause of this latter phenomenon has not been precisely determined, although it is possibly due to the attraction of that portion of the rod directly opposite a shallower portion of the layer of particles on the roller for particles in an adjacent deeper portion.

The voltage difference petween the particles and the articles, as well as between the particles and the distribution rod 25, may be varied over a considerable range, in accordance with the type and size of particles, the rate at which the articles are moved by the conveyor and the amount of solid particles to be applied to increments of area of the articles. For solid particles, such as salt, sugar, cinnamon, pepper, cheese, barbecue sauce powder, flour, and the like, the voltage may be varied between 3,000 volts and 50,000 volts. In general, the voltage should be adjustable, since a smaller number of particles can be attracted and dispersed in a uniform pattern by a lesser voltage applied to rod 25, than a greater number of particles per increment of time. For applying salt, for instance, to articles such as potato chips, the voltage may be maintained in the neighborhood of 20,000 volts, being adjusted upwardly or downwardly, in accordance with the amount of particles to be applied to the potato chips in a given amount of time, primarily dependent upon the speed at which the conveyor 11 moves the articles in the direction of arrow 19. In general, the higher the voltage applied to rod 25, the greater the spread of the pattern of deposition of the particles on the articles, i.e., the distance between arrows 29 and 31.

The articles 10 illustrated are generally in the shape of sweet rolls to which a top layer of sugar is to be applied, although the articles may be any other type of food product, or other type of product to which solid particles are to be applied. The voltage may also be adjusted in accordance with the size of the particles, since smaller particles appear to require a lesser voltage than larger particles. Thus, particles of cheese, which are to be applied to potato chips, would normally require a higher voltage than salt, for instance, to be applied to potato chips.

Siice the articles 10 are charged through the conveyor 11, two or more of the devices of this invention may be mounted in spaced positions along the conveyor 11, so that one type of solid particle may be applied by one device, and another type of particle applied by a subsequent device. For example, sugar and cinnamon may be applied to sweet rolls. Also, salt and cheese may be applied to potato chips. In some instances, two different types of particles may be mixed together and fed to and applied by the same device, although such mixing should be thorough and care should be taken that the particles are fed, as from the hopper 15, in a thoroughly mixed condition and in substantially the same proportions as desired to be finally applied to the articles 10.

It will be noted that the hopper 15, feed plate 16 and roller 12 are shown as merely illustrative of the apparatus, and this invention is not limited to the specific types of parts shown. For instance, a belt passing around a roller may be utilized, instead of the roller. Thus, the roller 12 is merely illustrative of surface means having a width corresponding to the conveying means and spaced above the conveying means, such surface means being adapted normally to discharge particles carried thereby, so that the particles will normally fall by gravity onto the articles moved by the conveyor. As will be evident, various other substitutions in the parts of the apparatus may be made, such as illustrated in FIGS. 3 and 4, and described below.

Figure 2:
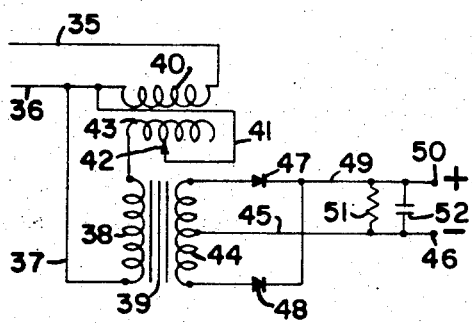
FIG. 2 is a circuit diagram showing one way in which the high voltage applied to certain parts of the apparatus of FIG. 1 may be readily obtained.

For producing the relative high voltage or potential difference between the wire 22 connected with the roller shaft and the wires 21 and 26, connected respectively with the conveyor and the rod 25, any suitable circuit may be utilized to transform the voltage normally available, such as 230 volts A.C., to a considerably higher voltage, i.e. at least 3,000 and up to 50,000 volts. One such circuit is shown in FIG. 2 and includes a pair of leads 35 and 36 which are connected to a conventional source of 230 volt A.C., and the latter connected by a wire 37 with one end of the primary coil 38 of a transformer having a core 39. Lead 36 is also connected to one end of a primary coil 40 of a voltage adjustment transformer, to the opposite end of which lead 35 is connected, with lead 36 connected by a wire 41 with a movable contact 42 for the voltage adjustment secondary coil 43, in turn connected to the opposite end of primary coil 38. A center tap of the secondary winding 44 of the transformer is connected by a wire 45 with the negative terminal 46, while each end of the secondary winding 44 is connected to a silicon diode rectifier 47 or 48, the opposite side of each being connected to the positive terminal 44 by a wire 45. As will be evident, the circuit of FIG. 2 is a voltage doubler circuit, since the voltage produced by the secondary winding of the transformer may, for instance, be approximately 14,000 volts, and the voltage difference between the positive and negative terminals approximately 28,000 volts. An external plate load resistance 51 and a capacitor 52 may be placed between the wires 45 and 49 as a smoothing choke.

Figure 3:
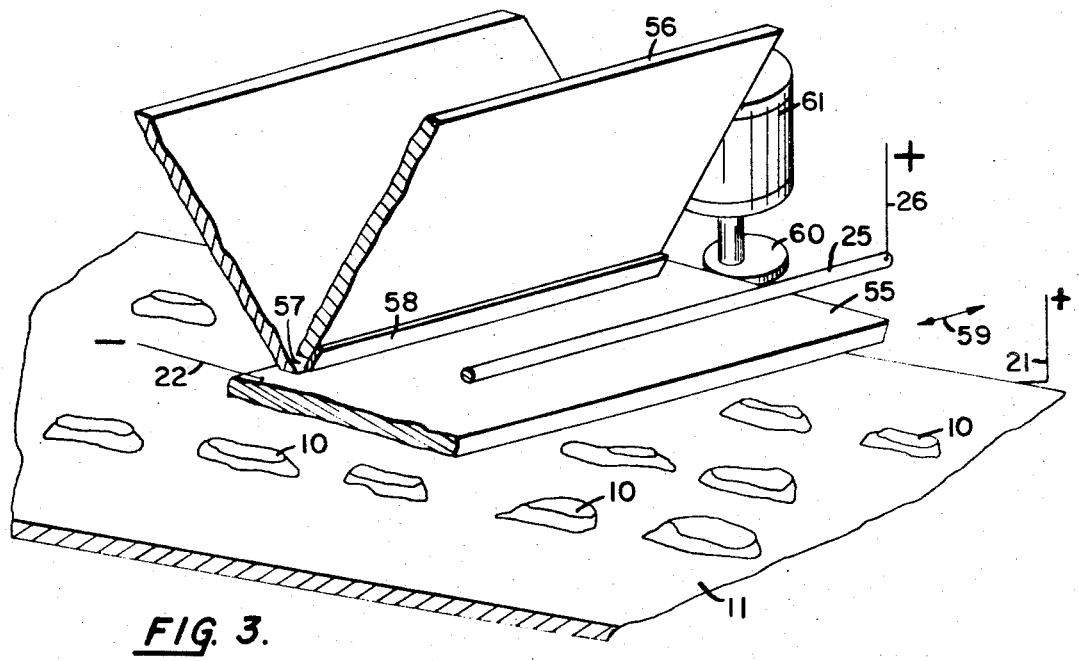
FIG. 3 is a fragmentary, sectional perspective view of alternative apparatus of this invention for applying solid particles to a series of products travelling along a conveyor beneath a distributing plate reciprocated by a motor driven cam.
Figure 4:
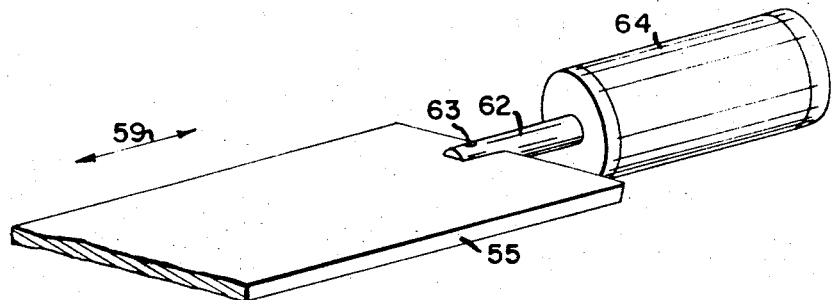
FIG. 4 is a fragmentary, sectional perspective view of a distributing plate reciprocated or vibrated by a solenoid operated plunger.

A further exemplification of surface means from which particles will normally fall by gravity is plate 55 of FIGS. 3 and 4, which receives particles discharged from a hopper 56 through an outlet slot 57, controlled by a gate 58. Plate 55 of FIG. 3 is reciprocated laterally, as indicated by arrow 59, by a cam 60 driven by a motor 61 at a suitable speed, while plate 55 of FIG. 4 is reciprocated or vibrated, as again indicated by arrow 59, by a plunger 62 attached to the plate, as by a pin 63, through an alternating current supplied to a solenoid type coil 64, or either A.C. or D.C. periodically supplied to the coil. As will be evident, other types of shaking devices, such as air or hydraulically operated, may be utilized to reciprocate or vibrate plate 55. Plate 55 is inclined downwardly from rear to front, so that the particles will move from rear to front on the plate through the influence of the reciprocation or vibration and would normally drop off the front edge of the plate and onto the articles 10 moved by conveyor 11 beneath the plate. As before, an electrostatic charge is given the particles by wire 22 connected to the plate and an opposite potential to the articles 10 by wire 21 connected to conveyor 11. Rod 25, connected by wire 26 to the same terminal as conveyor 11, is positioned above and, if desired, forwardly of the front edge, of plate 55, so that charged particles on the plate will be attracted upwardly to the rod, in the manner indicated by arrow 27 of FIG. 1. As before, the rod is positioned sufficiently above the plate, such as 1½ inches for salt and at an appropriate corresponding distance for other particles, to attract the oppositely charged particles toward but not onto the rod, after which the particles will fall forwardly in the longitudinally spread pattern exemplified by arrows 28, 29 and 30, 31 of FIG. 1. The inclination of plate 55 may be varied to accommodate different types of particles and also different rates of feed of the particles, although the inclination, for better control, should be less than that which would cause the particles to slide by gravity on the plate itself. Stainless steel is a preferred material for equipment used with food products, although other suitable materials may be used. Also, the top of plate 55, as well as the outer surface of roller 12, is preferably rough, rather than completely smooth.

Although different embodiments of this invention have been illustrated and described, it will be understood that other embodiments may exist and various changes may be made, without departing from the spirit and scope of this invention.

What is claimed is:
1. A method of applying solid particles to a plurality of articles comprising: moving said articles along a generally horizontal surface of a predetermined width and in succession past a predetermined area of the same width; feeding said particles on a surface of substantially the same width and above the first mentioned surface; establishing a relatively high voltage difference between the two surfaces to cause said particles and said articles to have an electrostatic charge of opposite polarity and to have a similar high voltage difference as said two surfaces; establishing a potential similar to that of said articles along a corresponding width at a position above the first mentioned surface and laterally of and above the second mentioned surface; and subjecting said particles to said high voltage difference and also to said potential which is of sufficiently high intensity and of opposite polarity than said particles such that said particles are attracted upwardly and laterally by said potential and then fall downwardly by gravity onto said articles where said electrostatic charge causes said particles to adhere to said articles.

2. A method as defined in claim 1, wherein said particle feeding surface generally extends horizontally.

3. A method as defined in claim 2, wherein said particle feeding surface is generally arcuate in a transverse direction.

4. A method as defined in claim 2, wherein said particle feeding surface is generally planar.

5. A method as defined in claim 1, including imparting a reciprocatory movement to said particles along said feeding surface.

6. A method as defined in claim 1, wherein said articles comprise a food product and said particles comprise a condiment, flavoring or the like for said food product.

7. Apparatus for applying solid particles to a plurality of articles, comprising: conveying means for moving said articles generally horizontally past a predetermined area; surface means having a width corresponding to said conveying means and spaced above said conveying means, said surface means being adapted normally to discharge particles carried by said surface means so that said particles will fall by gravity onto said articles; means for supplying said particles to said surface means; means for establishing a relatively high voltage difference between said surface means and said conveying means to cause said particles and articles to have a similar high voltage difference; an elongated, electrically conductive member disposed adjacent said surface means above the portion of said surface means from which said particles normally fall by gravity; and means for establishing a relatively high voltage difference between said elongated member and said surface means, said conductive member being positioned relative to said surface means such that said particles are attracted and are lifted upwardly towards said conductive member and then gravitate onto said conveying means without contacting said conductive member.

8. Apparatus as defined in claim 7, wherein said surface means includes a cylindrical roller which is rotated about an axis transverse to the direction of movement of said conveying means.

9. Apparatus as defined in claim 7, wherein said surface means includes a plate disposed above and transversely of said conveyor and inclined downwardly and forwardly.

10. Apparatus as defined in claim 9, including means for imparting a reciprocatory movement to said plate.

References Cited

UNITED STATES PATENTS

| | | | |
|---|---|---|---|
| Re. 20,660 | 2/1938 | Schacht | 117—17 |
| 2,027,308 | 1/1936 | Schacht | 117—17 X |
| 2,082,182 | 6/1937 | Schacht | 117—17 |
| 2,128,907 | 9/1938 | Brenner et al. | 117—17 |
| 2,245,301 | 6/1941 | Schacht | 117—17 |
| 2,394,657 | 2/1946 | Beregh | 118—636 X |
| 2,748,018 | 5/1956 | Miller | 118—626 X |
| 2,976,153 | 3/1961 | Arenson | 99—100 |
| 3,221,938 | 12/1965 | Yonkers et al. | 222—76 |
| 3,273,016 | 9/1966 | Buhler | 117—17 X |
| 3,310,205 | 3/1967 | Meyer | 222—193 |

WILLIAM D. MARTIN, Primary Examiner

E. J. CABIC, Assistant Examiner

U.S. Cl. X.R.

99—1, 92, 100; 118—24, 308, 636, 638; 222—76